US00RE36980E

United States Patent [19]

Kim et al.

[11] E Patent Number: Re. 36,980

[45] Reissued Date of Patent: Dec. 5, 2000

[54] PARTIAL RESPONSE TRELLIS DECODER FOR HIGH DEFINITION TELEVISION (HDTV) SYSTEM

[75] Inventors: Dae J. Kim; Heung S. Kwak, both of Kyungki-do; Ho J. Nam, Seoul, all of Rep. of Korea

[73] Assignee: LG Electronics Inc., Seoul, Rep. of Korea

[21] Appl. No.: 09/053,131

[22] Filed: Apr. 1, 1998

Related U.S. Patent Documents

Reissue of:

[64] Patent No.: 5,508,752
Issued: Apr. 16, 1996
Appl. No.: 08/376,369
Filed: Jan. 23, 1995

[30] Foreign Application Priority Data

Apr. 12, 1994 [KR] Rep. of Korea ..... 94-7640
Apr. 12, 1994 [KR] Rep. of Korea ..... 94-7641

[51] Int. Cl.[7] ..... H04N 5/21

[52] U.S. Cl. ..... 348/608; 348/614; 348/470; 455/296; 455/303; 375/346

[58] Field of Search ..... 375/265, 346; 455/295, 296, 303; 348/21, 608, 611, 614, 461, 466, 470

[56] References Cited

U.S. PATENT DOCUMENTS 4,493,082 1/1985 Cumberton et al. .
5,115,438 5/1992 Friederichs et al. .
5,408,502 4/1995 How ..... 375/340
5,418,798 5/1995 Wei ..... 375/265
5,438,369 8/1995 Citta et al. ..... 348/21
5,465,273 11/1995 Cole ..... 375/265
5,512,957 4/1996 Hulyalkar ..... 375/350
5,559,835 9/1996 Betts ..... 375/265
5,583,889 12/1996 Citta et al. ..... 375/341
5,621,761 4/1997 Heggard ..... 375/365
5,706,312 1/1998 Wei ..... 375/265

FOREIGN PATENT DOCUMENTS 0 353 694 2/1990 European Pat. Off. .
0 525 641 2/1993 European Pat. Off. .

OTHER PUBLICATIONS

VSB Transmission System: Zenith Electronics Corp; Dec. 17, 1993.

Precoding Technique for Partial–Response Channels with Applications to HDTV; Lee–Fang Wei; IEEE Journal on Selected Areas of Communications; vol. 11 #1, Jan. 1993.

Kirkland, et al., High–speed Viterbi decoder memory design, Canadian Journal of Electrical and Computer Engineering, vol. 15, No. 3, Aug. 1, 1990, pp. 107–114.

*Primary Examiner*—Victor R. Kostak
*Attorney, Agent, or Firm*—Long, Aldridge & Norman LLP

[57] ABSTRACT

A partial response Trellis decoder that performs Trellis coded modulation in a high definition television (HDTV) having a specific and detailed configuration and includes a distance mapper for calculating first, second, third and fourth Euclidean distances between the input signal and a reference value; a Viterbi decoder for Viterbi decoding the first, second, third and fourth Euclidean distances calculated by the distance mapper; a first delay for delaying and outputting the Yiterbi decoded data for each Euclidean distance; a ruler selector for selecting a ruler type signal based on the signals output by the first delay; and a slicer for slicing the selected ruler type signal and the input signal.

49 Claims, 9 Drawing Sheets

FIG. 14

| | |
|---|---|
| $d_0$ | DISTANCE BETWEEN THE INPUT SIGNAL AND THE CLOSEST POINT AMONG (0,8,−8) |
| $d_1$ | DISTANCE BETWEEN THE INPUT SIGNAL AND THE CLOSEST POINT AMONG (2,10,−6,−14) |
| $d_2$ | DISTANCE BETWEEN THE INPUT SIGNAL AND THE CLOSEST POINT AMONG (4,12,−4,−12)) |
| $d_3$ | DISTANCE BETWEEN THE INPUT SIGNAL AND THE CLOSEST POINT AMONG (6,14,−2,−10) |

FIG. 15

| | RULER TYPE | OUTPUT TYPE (1,0,1) (WHEN INPUT (−14 TO 14)) | | |
|---|---|---|---|---|
| | | 1 | 0 | 1 |
| $(d_{1'})$ → | I | −14 | −6 | 2 |
| $(d_{2'})$ → | II | −12 | −4 | 4 |
| $(d_{3'})$ → | III | −10 | −2 | 6 |
| $d_0$ → | IV | −8 | 0 | 8 |
| $d_1$ → | V | −6 | 2 | 10 |
| $d_2$ → | VI | −4 | 4 | 12 |
| $d_3$ → | VII | −2 | 6 | 14 |

PARTIAL RESPONSE TRELLIS DECODER FOR HIGH DEFINITION TELEVISION (HDTV) SYSTEM

Matter enclosed in heavy brackets [ ] appears in the original patent but forms no part of this reissue specification; matter printed in italics indicates the additions made by reissue.

FIELD OF THE INVENTION

The present invention relates to a partial response trellis decoder for performing trellis coded modulation in a high definition television (HDTV).

DISCUSSION OF THE RELATED ART

In general, a HDTV broadcasting method performs a transmission at the same frequency as that of the National Television System Committee (NTSC), 6 MHz. However, unlike the NTSC, the HDTV broadcasting transmission is performed digitally, allowing for a higher definition when broadcasting and receiving, in relation to the width and length of the screen.

The Grand Alliance of the U.S.A. has recently proposed the eight vestigial sideband modulation (VSB) method as a HDTV transmission method. In the 8 VSB method, a symbol composed of two bits is coded into three bits and is then transmitted at eight levels. According to the eight VSB method, after the 2 bit input data is received, the upper bit is not coded in a Trellis encoder but the remaining lower bit is half convolutionally coded to form two bits, thereby resulting in three bits total.

FIG. 1 is a schematic diagram of the transmission side of a general HDTV, and FIG. 2 is a schematic diagram of the reception side of a general HDTV.

As shown in FIG. 1, the transmission side includes a data randomizer 1 for performing an exclusive OR operation on a video, audio and auxiliary signal which are input in the unit of a byte, in a pseudo random sequence. The data randomizer 1 then selects data randomly. A Reed-Solomon encoder 2 is used for Reed-Solomon (RS) encoding the data output by the randomizer 1 so as to supply an error correction capability for any noise or other interference generated in a channel. A data interleaver 3 is used for interleaving the data output by the R-S encoder 2. A Trellis encoder 4 Trellis encodes the data output by the data interleaver 3. A multiplexer 7 adds a segment synchronization signal 5 and a field synchronization signal 6 to the signal output by the Trellis encoder 4. A pilot inserter 8 adds a pilot, which allows for efficient automatic frequency control (AFC), to the signal output by the multiplexer 7. A VSB modulator 9 is used for modulating the signal output by the pilot inserter 8 with a VSB, and a radio frequency up-converter 10 transmits the signal from the VSB modulator 9.

As shown in FIG. 2, the reception side includes a tuner 11 for tuning a signal input via an antennae, an IF filter and synchronous detector 12 for demodulating the signal output by the tuner 11 into a band of 44 MHz, a sync and timing unit 13 for locating a symbol timing, a data segment synch and a data field sync from the signal output by the IF filter and synchronous detector 12, a NTSC rejection filter 14 for NTSC rejection-filtering the signal output by the IF filter and synchronous detector 12 in case of a co-channel NTSC interference, an equalizer 15 for removing a ghost from the signal output by the NTSC rejection filter 14, a phase tracker 16 for correcting a phase error of the signal output by the equalizer 15, a Trellis decoder 17 for Trellis decoding the signal output by the phase tracker 16 to detect data, a data deinterleaver 18 for deinterleaving in order to separate a burst error from the signal output by the Trellis decoder 17, a R-S decoder 19 for R-S decoding the signal output by the data deinterleaver 18, and a data derandomizer 20 for derandomizing the signal output by the R-S decoder 19.

The operation of the transmission and reception sides of a HDTV having the aforementioned configuration will be described.

Data to be transmitted is randomized in data randomizer 1 by a pseudo random sequence and an exclusive OR operation and is provided with an error correcting capability for any noise or other interference generated in a channel by being R-S encoded in R-S encoder 2 under the condition R-S (208, 188) t=10. R-S encoding can correct all errors even if a 20 byte redundance out of 188 bytes are added to generate 10 errors.

The data output by R-S encoder 2 is interleaved so that if burst error is generated in the data interleaver 3, horizontal input data is read vertically for output in order to compensate for the burst error.

The signal output by data interleaver 3 is Trellis coding modulated in Trellis encoder 4. The data output by data interleaver 3 outputs 2 bits to the Trellis encoder 4, the upper bit is not coded and the lower bit is convolutionally coded to form 2 bits, thereby outputting 3 bits total. The output data is Trellis coding modulated, that is, the data is mapped into 8 levels having a high error correction capability.

The Trellis coded modulation (TCM) method, by which the convolutionally coded signal is modulated, is a channel coding method capable of obtaining a signal-to-nomse ratio (SNR) more than about 3 dB without a loss of channel band width. For this reason, the transmission and reception sides for a HDTV adopt both the R-S coding method and the TCM method.

The signal output by the Trellis encoder 4 is supplemented with the segment sync signal 5 and the field sync signal 6 in multiplexer 7 and is further supplemented with a pilot signal in pilot inserter 8 so that the reception side performs the AFC efficiently.

The signal output by the pilot inserter 8 is transmitted through an antennae via VSB modulator 9 and RF up-converter 10.

On the reception side, the processes are performed inversely to the processes on the transmission side. The signal input through the antennae is demodulated into an intermediate frequency band of 44 MHz via the tuner 11, the IF filter and the synchronous detector 12, and is then VSB filtered. The frequency and phase of the signal is set with the assistance of the pilot signal.

The signal output by the IF filter and synchronous detector 12 is detected by the NTSC rejection filter 14 in accordance with the training sequence of the data field sync. If the signal has a co-channel NTSC interference, NTSC rejection filtering is performed. If not, the NTSC filtering is by-passed.

The ghost of the signal output by the NTSC rejection filter 14 is removed by the equalizer is, and the phase error is corrected in phase tracker 16 before input to the Trellis decoder 17.

The signal output by the phase tracker 16 is detected using the different Viterbi decoders for the case of using the NTSC rejection filter in Trellis decoder 17 and the case of bypassing the same. The signal is deinterleaved by the data interleaver 18 in order to separate the burst error, and the error is then corrected by the R-S decoder 19. The reception is completed via data derandomizer 20.

The operation of the Trellis decoder 17 will be described in more detail. In general, if the channel of a NTSC broadcasting station is located in an area adjacent to a HDTV broadcasting station, interference occurs. A NTSC rejection filter is used to remove the channel NTSC interference.

FIG. 3 is a detailed diagram showing the conventional combination of a NTSC rejection filter 14 and a Trellis decoder 17. FIG. 4 is a detailed diagram showing the combination of the conventional Trellis decoder 17 and the data deinterleaver 18.

The NTSC rejection filter 14 includes a delay 22 and a subtracter 23, as shown in FIG. 3. If the signal passes through the NTSC rejection filter 14, the signal also passes through an 8 state partial response decoder 24. If the signal does not pass through the NTSC rejection filter 14, the signal passes through a 4 state optimal Trellis decoder 25.

FIG. 4 shows that the partial response decoder 24 is actually composed of 12 Trellis decoders 27 to 31. A first Trellis decoder 27 receives and decodes the first, 13th, 25th, 37th,... symbols among the input signals. A second Trellis decoder 28 receives and decodes the second, 14th, 26th, 38th,... symbols among the input signals. Similar decoding occurs for 29, 30 and 31.

The signals are demultiplexed in a switch 26 in the unit of 12 symbols and are multiplexed again in another switch 32, thereby deinterleaving data in the unit of 12 symbols to be output.

However, since the conventional transmission and reception apparatus for a HDTV does not provide a specific and detailed construction for the Trellis encoder and the Trellis decoder, constructing the transmission and reception apparatus for the HDTV is complicated.

SUMMARY OF THE INVENTION

To solve the above problem, it is an object of the present invention to provide a partial response Trellis decoder having a specific and detailed configuration.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the partial response Trellis decoder for a HDTV according to one embodiment of the present invention comprises: a distance mapper for calculating first, second,- third and fourth Euclidean distances between the input signal and a reference value; a Viterbi decoder for Viterbi decoding the first, second, third and fourth Euclidean distances calculated by the distance mapper; a first delay for delaying and outputting the Viterbi decoded data for each Euclidean distance; a ruler selector for selecting a ruler type signal based on the signals output by the first delay; and a slicer for slicing the selected ruler type signal and the input signal.

The partial response Trellis decoder for a high definition television (HDTV) according to another embodiment comprises: a distance mapper for calculating first, second, third and fourth Euclidean distances between the from input signal and a reference value; a Viterbi decoder for Viterbi decoding the first, second, third and fourth Euclidean distances calculated by the distance mapper; a first delay means for delaying and outputting the Viterbi decoded data for each Euclidean distance; a ruler selector for selecting a ruler type signal based on the signals output by the first delay means; a hard decider for slicing and hard deciding the input signal; and a multiplexer for selecting and outputting one of the signals output by the hard decider.

The partial response Trellis decoder for a high definition television (HDTV) according to still embodiment comprises: a distance mapper for calculating first, second, third and fourth Euclidean distances between the from input signal and a reference value; a hard decider for hard deciding the input signal and for outputting the hard decision value; and a Viterbi decoder for Viterbi decoding the data output by the distance mapper and said hard decider.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 14 is a table defining the distances $d_0$, $d_1$, $d_2$ and $d_3$ that are calculated by the distance mapper; and FIG. 15 is a table defining the ruler types selected by the ruler selector.

DETAILED DESCRIPTION OF THE INVENTION

Figure 5:
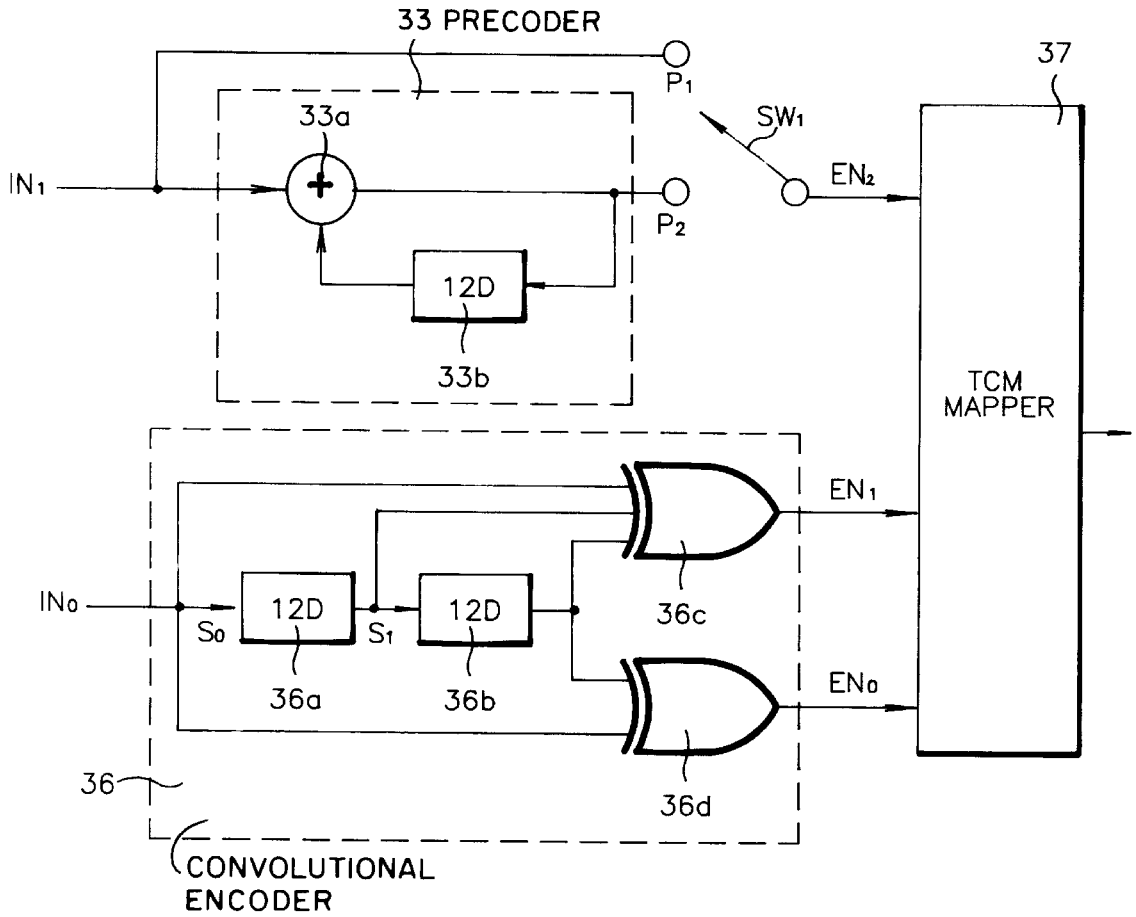
FIG. 5 is a schematic diagram of a general Trellis encoder.

As shown in FIG. 5, a general Trellis encoder includes a precoder 33 for precoding the most significant bit output by a data interleaver, a switch $SW_1$ for selecting the most significant bit output by the data interleaver if there is no NTSC interference and otherwise selecting the precoded signal output by the precoder 33, a convolutional encoder 36 for convolutionally encoding the least significant bit output by the data interleaver and outputting the same as two bits, and a TCM mapper 37 for receiving a signal consisting of the bit output by the switch $SW_1$ and the two bits output by the convolutional encoder 36 and for outputting a corresponding voltage level. The general Trellis encoder outputs the most significant bit output by the data interleaver to the TCM mapper 37 without encoding upon receiving the two bit signal output by the data interleaver, and transforms the least significant bit into a two bit signal via the convolutional encoder 36 for output to the TCM mapper 37, which performs a TCM mapping.

The precoder 33 includes a delay 33b for delaying the signal received from the data interleaver by 12 symbols and an adder 33a for adding the delayed signal and the signal received from the data interleaver. The convolutional encoder 36 includes a delay 36a for delaying the least significant bit output by the data interleaver by 12 symbols, a delay 36b for secondarily delaying the signal output by the delay 36a by 12 symbols, a first exclusive OR gate 36c for performing an exclusive OR operation on the signal output by the data interleaver ($S_0$), the signal output by the delay 36a ($S_1$) and the signal output by the delay 36b ($S_2$) and for outputting the resultant one bit signal $EN_1$ to the TCM mapper 37, and a second exclusive OR gate 36d for performing an exclusive OR operation on the signal $S_0$ and the signal $S_2$ and for outputting the resultant one bit signal $EN_0$ to the TCM mapper 37.

Figure 6:
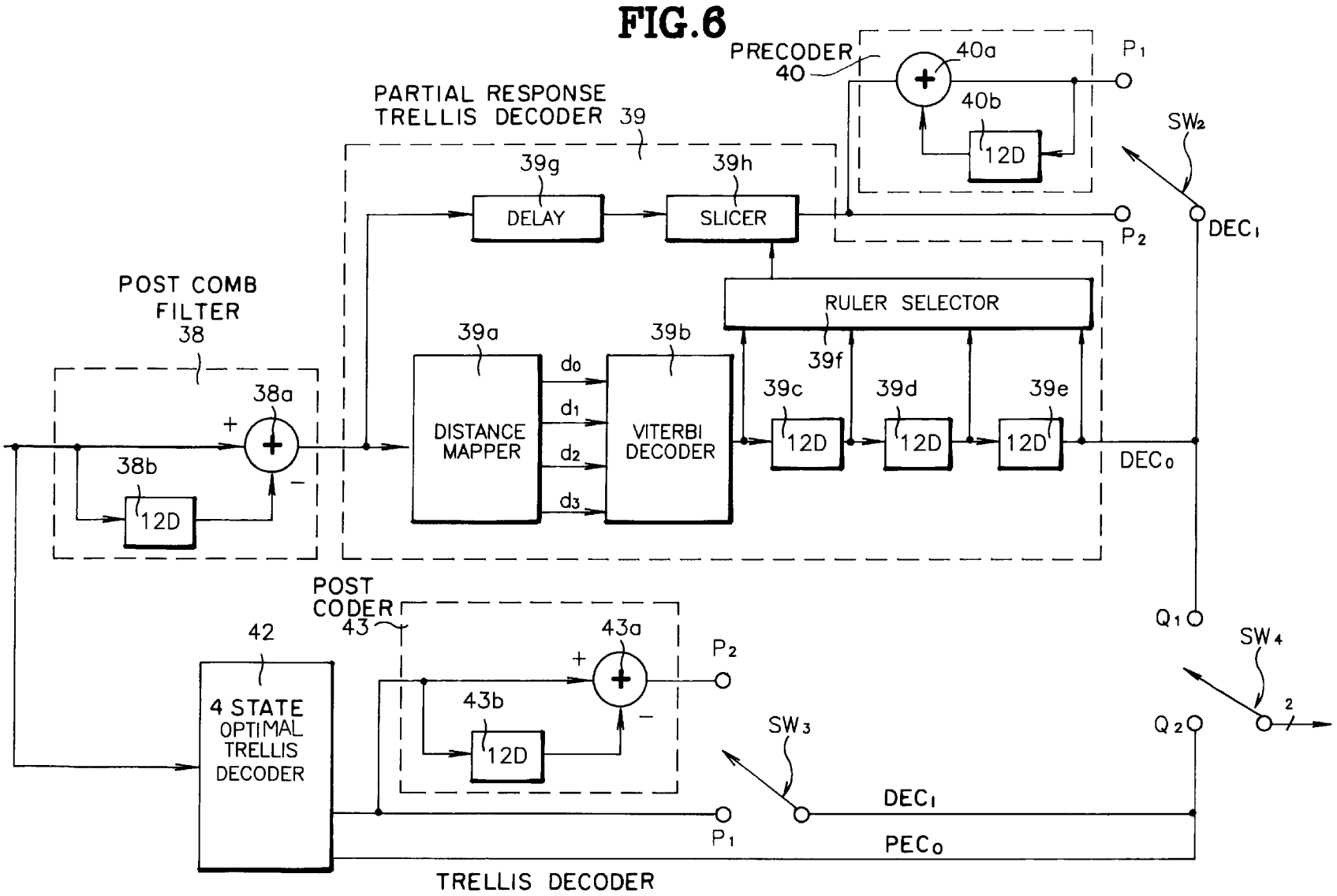
FIG. 6 is a schematic diagram of a Trellis decoder according to the present invention.

As shown in FIG. 6, the Trellis decoder of this embodiment includes a post-comb filter 38 for filtering a NTSC broadcasting signal band when there is NTSC interference, a partial response Trellis decoder 39 for decoding the signal output by the post-comb filter 38, a precoder 40 for precoding the signal output by the partial response Trellis decoder 39, a switch $SW_2$ for selecting and outputting either the signal output by the partial response Trellis decoder 39 or the signal output by the precoder 40, a four state optimal Trellis decoder 42 for use when there is no NTSC interference, a postcoder 43 for postcoding the signal output by the four state optimal Trellis decoder 42, a switch $SW_3$ for selecting and outputting either the signal output by the four state optimal Trellis decoder 42 or the signal output by the postcoder 43, and a switch $SW_4$ for selecting and outputting either the signal output by the switch $SW_2$ partial response Trellis decoder 39, or the signal output by the four state optimal Trellis decoder 42 and switch $SW_3$, depending on the presence or absence of NTSC interference.

Figure 1:
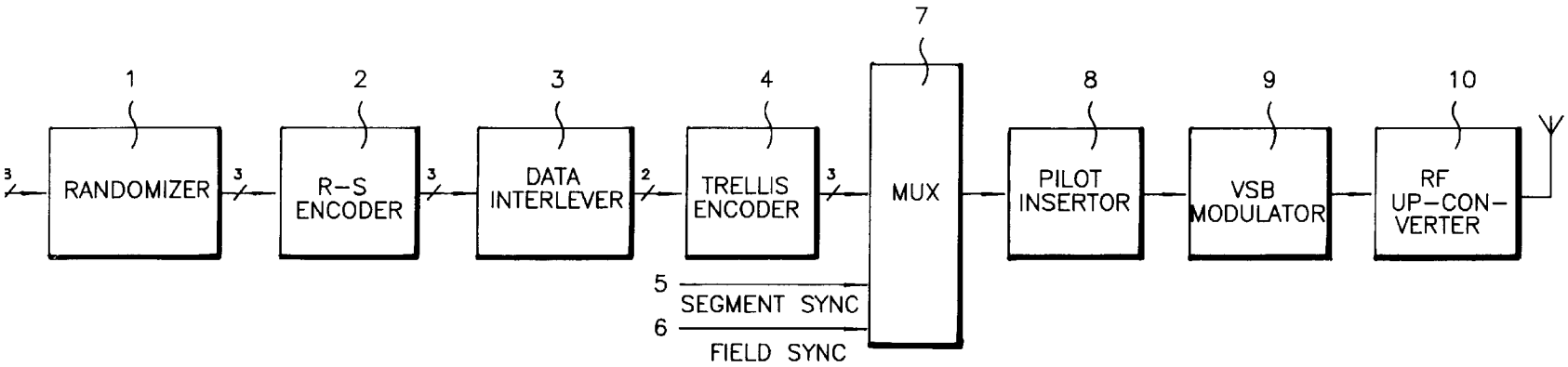
FIG. 1 PRIOR ART
FIG. 1 is a schematic diagram of the transmission side of a general HDTV.
Figure 2:
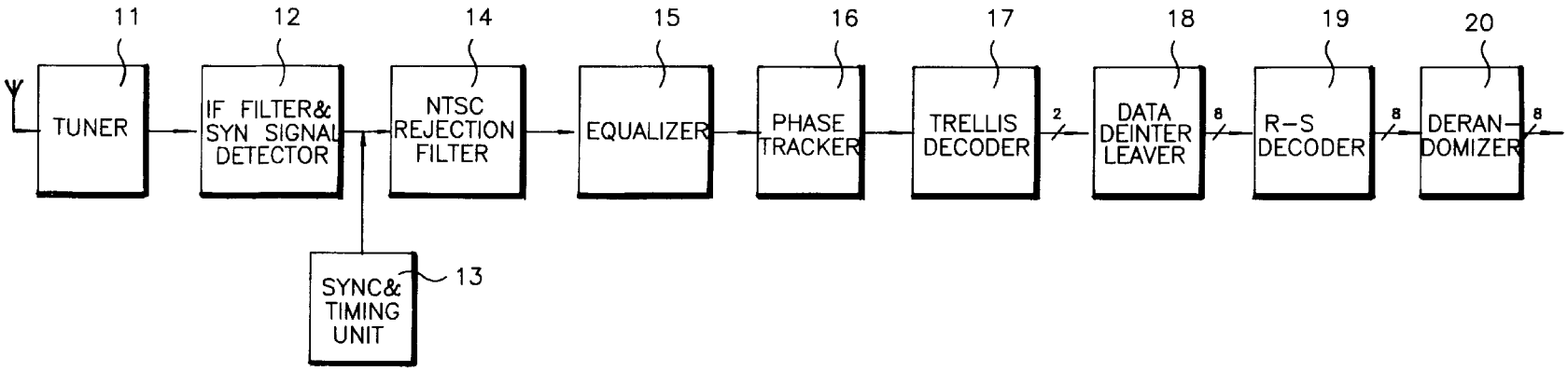
FIG. 2 PRIOR ART
FIG. 2 is a schematic diagram of the reception side of a general HDTV.
Figure 3:
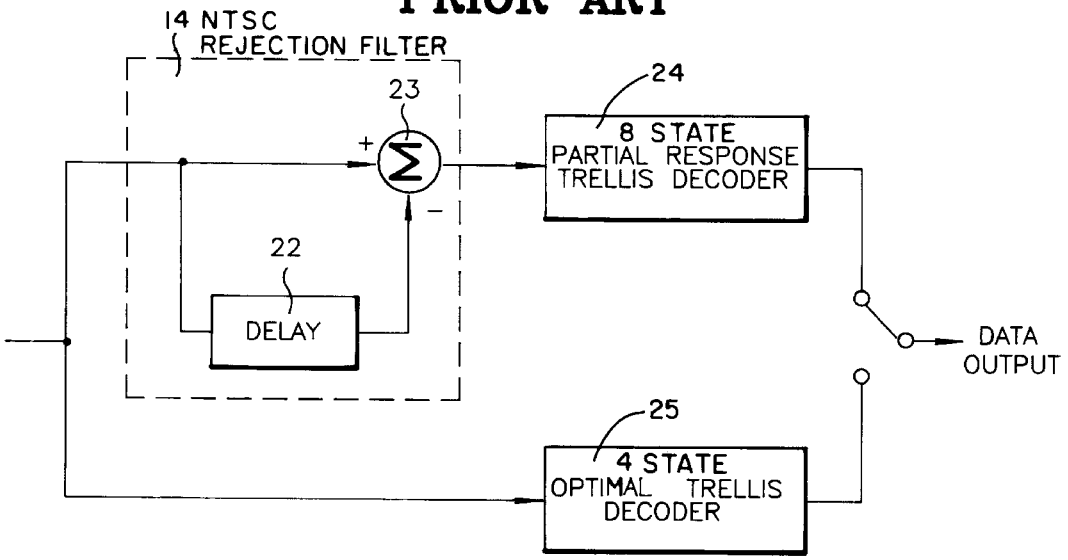
FIG.3 PRIOR ART
FIG. 3 is a detailed schematic diagram showing the conventional NTSC rejection filter combined with the Trellis decoder.
Figure 4:
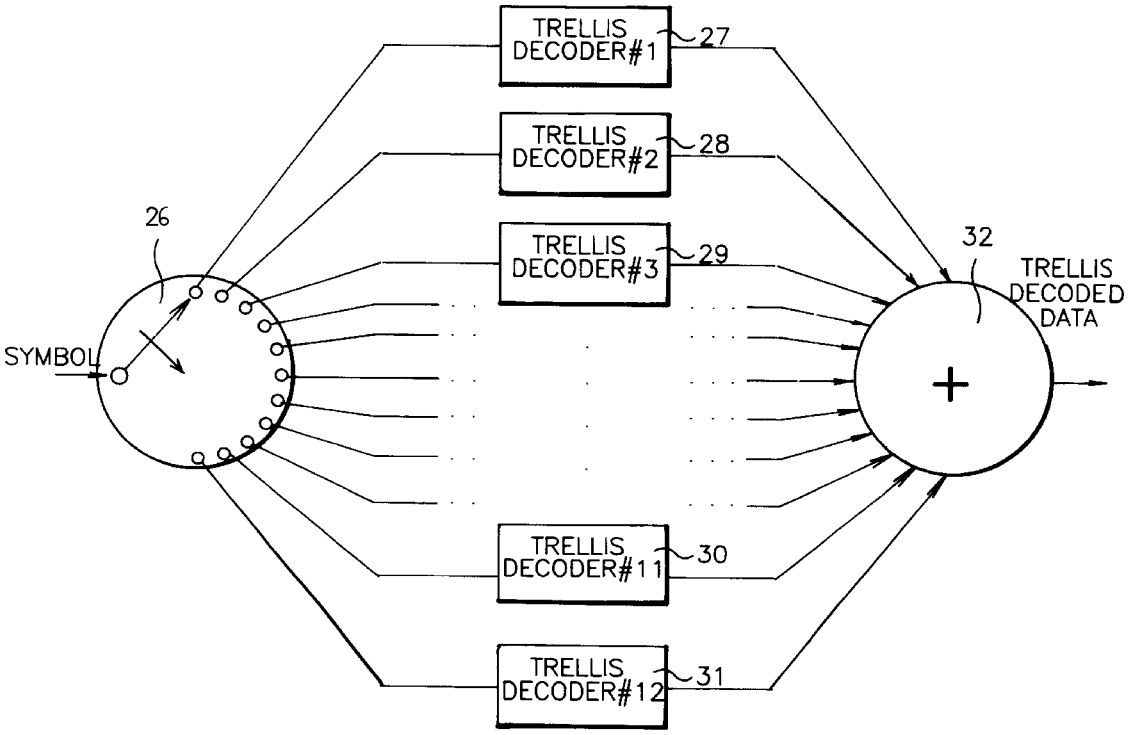
FIG.4 PRIOR ART
FIG. 4 is a detailed schematic diagram showing the combination of a conventional Trellis decoder and a data deinterleaver.

In the Trellis decoder shown in FIG. 3, if a NTSC broadcasting station is located in an area adjacent to a HDTV broadcasting station, the same channel NTSC interference occurs. Therefore, in the embodiment shown in FIG. 6 the operation of the Trellis decoder is selectively determined depending on the presence or absence of a NTSC broadcasting station of the same channel. Accordingly, switch $SW_4$ selects between using a NTSC rejection filter if there is NTSC interference and using an optimal Trellis decoder 42 if there is no NTSC interference. A four state Viterbi decoder is used as the optimal Trellis decoder 42 to decode the IN1 and IN0 prior to being convolutionally coded in the Trellis encoder and outputs the decoded signals $DEC_1$ and $DEC_0$.

The post-comb filter 38 and post coder 43 both include a delay 38b and 43b for delaying the input value by 12 symbols and a subtracter 38a and 43a for obtaining the difference between the nondelayed input signal and the signal output by the delay 38b. The precoder 40 includes an adder 40a for adding the signals output by the partial response Trellis decoder 39 and a delay 40b, for delaying the signal output by the adder 40a by 12 symbols.

The operation of the Trellis encoder and decoder having the aforementioned configuration will now be described.

In the Trellis encoder, if two bit input is received, the most significant bit $IN_1$ is input to the TCM mapper 37 as an uncoded bit and the least significant bit is transformed into two bits via the convolutional encoder 36 and is to then input to the TCM mapper 37.

The switches $SW_1$, $SW_2$ and $SW_3$ as shown in FIGS. 5 and 6 are all connected to a port $P_1$ in the embodiment discussed below. The convolutional encoder 36 produces a four state Trellis diagram, where $EN_1$ is obtained by performing an exclusive OR operation on the signals $S_0$, $S_1$ and $S_2$ and $EN_0$ is obtained by performing an exclusive OR operation on the signals $S_O$ and $S_2$. The Euclidean distances $d_0$, $d_1$, $d_2$ and $d_3$ obtained by the distance mapper 39a are variable. Thus, the TCM mapper 37 receives three bits $EN_2$, $EN_1$ and $EN_0$ and outputs the voltage level corresponding to the respective cases, as shown in FIG. 7.

Figure 7:
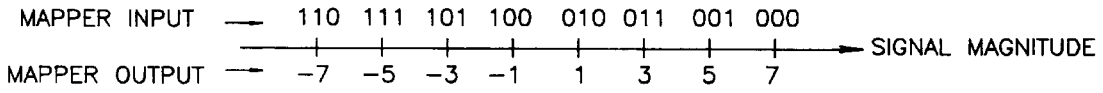
FIG. 7 is a diagram for explaining the operation of the TCM mapper shown in FIG. 5.

The signal magnitudes shown in FIG. 7 are not absolute values but are relative values. For example, if the three bits $EN_2$, $EN_1$ and $EN_0$ are '011', the voltage output is 3V.

The mapping method shown in FIG. 7 is variable. However, the block diagram of the partial response Trellis decoder does not change but the Euclidean distances $d_0$, $d_1$, $d_2$ and $d_3$ obtained by the distance mapper 39a change.

As described above, the Trellis decoder according to the present embodiment, may or may not require a NTSC rejection filter. If a NTSC broadcasting station is in an area adjacent to a HDTV broadcasting station, switch $SW_4$ selects the signal output by the NTSC rejection filter. If there is NTSC interference, the switch $SW_4$ selects a point $Q_1$, the optimal Trellis decoder 42 decodes the two bit signal $IN_1$ and $IN_0$ input to the Trellis encoder by using the four state Viterbi decoder and then outputs the decoded signal $DEC_1$ and $DEC_0$. The partial response Trellis decoder 39 decodes an input signal where the Trellis encoder of FIG. 5 and the post-comb filter 38 are regarded as one encoder.

Figure 8:
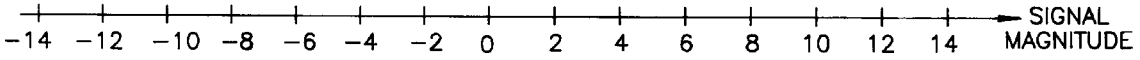
FIG. 8 is a diagram for explaining the signal levels of the post-comb filter shown in FIG. 6.

In order to filter the noise of the NTSC broadcasting signal which may be loaded on an 8 level signal output by the TCM mapper 37 of the Trellis encoder, a 15 level signal is output to the post-comb filter 38, as shown in FIG. 8. The signal output by the partial response Trellis decoder 39 is decoded into the original data and is selected by the switch $SW_4$ for output.

The partial response Trellis decoder 39 according to one embodiment of the present invention includes a distance mapper 39a, a Viterbi decoder 39b, delays 39c, 39d and 39e, a ruler selector 39f and a slicer 39h. The slicer 39h performs a slicing operation depending on the selected ruler types and outputs the sliced results. The distance mapper 39a calculates Euclidean distances $d_0$, $d_1$, $d_2$ and $d_3$ using the signals output by the post-comb filter 38 which removes NTSC interference.

As shown in FIG. 14, the distance mapper 39a calculates a first Euclidean distance $d_0$, using the distance between the input signal and the closest point among (0, 8, −8). A second Euclidean distance $d_1$ is calculated using the distance between the input signal and the closest point among (2, 10, −6, −14). A third Euclidean distance $d_2$ is calculated using the distance between the input signal and the closest point among (4, 12, −4, −12). A fourth Euclidean distance $d_3$ is calculated using the distance between the input signal and the closest point among (6, 14, −2, −10).

The Viterbi decoder 31b, 8 state Viterbi-decodes the Euclidean distances $d_0$, $d_1$, $d_2$ and $d_3$ output by the distance mapper 39a. The data output by the Viterbi decoder 39b is delayed in three steps and is output to the ruler selector 39f.

The delay means includes first delay 39c for delaying the data output by the Viterbi decoder 39b by 12 symbols and for outputting the delayed signal to the ruler selector 39f, a second delay 39d for delaying the data output by the first delay 39c by 12 symbols and for outputting the delayed signal to the ruler selector 39f, and a third delay 39e for delaying the data output by the second delay 39d by 12 symbols and for outputting the decoded signal $DEC_0$ , obtained by decoding the least significant bit $IN_0$ prior to being convolutionally coded, to the switch $SW_4$ and to the ruler selector 39f.

Figure 9:
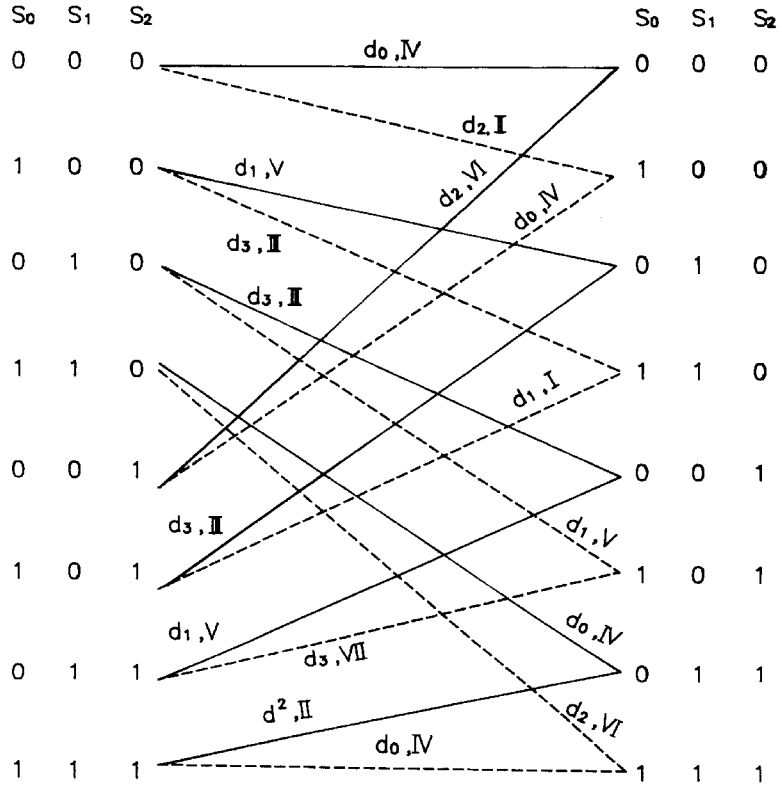
FIG. 9 is a diagram for explaining the ruler type slicer shown in FIG. 6.

The ruler selector 39f selects seven ruler types I, II, III, IV, V, VI and VII depending on the signals output by the delay means. As shown in FIG. 9, the ruler selector 39f selects a ruler type based on a current state and a next state. The selection of the ruler type is based on the following: ruler type IV is selected if the signal output by the delay means has a current state '000' a next state '000,' a ruler type II is selected if the signal output by the delay means has a current state '000' and a next state '100,' a ruler type V is selected if the signal output by the delay means has a current state '100' and a next state '010,' a ruler type III is selected if the signal output by the delay means has a current state '100' and a next state '110,' a ruler type III is selected if the signal output by the delay means has a current state '010' and a next state '001,' a ruler type V is selected if the signal output by the delay means has a current state '010' and a next state '101,' a ruler type IV is selected if the signal output by the delay means has a current state '110' and a next state '011,' a ruler type VI is selected if the signal output by the delay means has a current state '110' and a next state '111,' a ruler type VI is selected if the signal output by the delay means has a current state '001' and a next state '000,' a ruler type IV is selected if the signal output by the delay means has a current state '001' and a next state '100,' a ruler type III is selected if the signal output by the delay means has a current state '101' and a next state '010,' a ruler type I is selected if the signal output by the delay means has a current state '101' and a next state '110,' a ruler type V is selected if the signal output by the delay means has a current state '011' and a next state '001,' a ruler type VII is selected if the signal output by the delay means has a current state '011' and a next state '101,' a ruler type II is selected if the signal output by the delay means has a current state '111' and a next state '011,' and a ruler type IV is selected if the signal output by the delay means has a current state '111' and a next state '111.'

Referring back to FIG. 6 the delay 39g delays an input signal for a constant time in order to synchronize the input signal with the ruler type selection of the ruler selector 39f.

The slicer 39h slices the signal output by delay 39g depending on the ruler types selected by the ruler selector 39f and outputs the most significant bit $IN_1$ of the decoded signal $DEC_1$. As shown in FIG. 15, if the ruler type is I, the slicer 39h outputs '1' if the input signal is close to −14 or 2 and '0' if the input signal is close to −6. If the rule type is II, the slicer 39h outputs '1' if the input signal is close to −12 or 4 and '0' if the input signal is close to −4. If the ruler type is III, the slicer 39h outputs '1' if the input signal is close to −10 or 6 and '0' if the input signal is close to −2. If the ruler type is IV, the slicer 39h outputs '1' if the input signal is close to −8 or 8 and '0' if the input signal is close to 0. If the ruler type is V, the slicer 39h outputs '1' if the input signal is close to −6 or 10 and '0' if the input signal is close to 2. If the ruler type is VI, the slicer 39h outputs '1' if the input signal is close to −4 or 12 and '0' if the input signal is close to 4. If the ruler type is VII, the slicer 39h outputs '1' if the input signal is close to 14 or −2 and '0' if the input signal is close to 6.

If there is noise and the signal output by the post-comb filter 38 is output as a 15 level signal, then exact values as shown in FIG. 8, cannot be obtained. Values other than −14, −12, −10,..., 10, 12, 14, may be obtained. Although the values output by the post-comb filter 38 may be other than those shown in FIG. 8, the partial response Trellis decoder 39 should decode the values. Therefore, even if the exact values are not obtained due to the noise, the distance mapper 39a of the partial response Trellis decoder 39 obtains the Euclidean distances $d_0$, $d_1$, $d_2$ and $d_3$ in order to decode the values.

If the signal output by the post-comb filter 38 is 0.5 in magnitude, the Euclidean distances $d_0$, $d_1$, $d_2$ and $d_3$ are obtained in the following manner.

As shown in FIG. 14, $d_O$ represents the distance between the input signal and the closest point among (0, 8, −8). Therefore, when the magnitude of the input signal is 0.5, the signal is closest to 0, and the distance is 0.5. Also, since $d_1$ represents the distance between the input signal and the closest point among (2, 10, −6, −14), when the magnitude of the input signal is 0.5, the signal is closest to 2, and the distance is 1.5. Similarly, the Euclidean distance $d_2$ is closest to 4 and the distance is 3.5, and $d_3$ is closest to −2 and the distance is 2.5. Therefore, the values of the Euclidean distances $d_0$, $d_1$, $d_2$ and $d_3$ are 0.5, 1.5, 3.5 and 2.5, respectively.

The thus obtained values output by the distance mapper 39a are input to the Viterbi decoder 39b for decoding. The Euclidean distances to be used for each transition are one among $d_0$, $d_1$, $d_2$ and $d_3$ and the used Euclidean distances $d_0$, $d_1$, $d_2$ and $d_3$ are decoded by means of the 8-state Trellis diagram shown in FIG. 9, to thereafter be output bit by bit. The one output bit $DEC_0$ corresponds to the lower one bit $IN_0$ among the two data bits input from the Trellis encoder.

The bit output by the Viterbi decoder 39b is output via three sequential delays 39c, 39d and 39e. The data each delayed in the delays 39c, 39d and 39e form a current state and the inputs of the delays 39c, 39d and 39e form a next state, as shown in FIG. 9. The signals output by the delays 39c, 39d and 39e are input to the ruler selector 39f as the current state or next state. The path of the transitions are performed in accordance with the Trellis diagram shown in FIG. 9. FIG. 9 shows the transition from the current state into the next state, solid lines represent that the next signal is 0, and dot lines represent that the next signal is 1.

The ruler selector 39f selects one of the ruler types I, II, III, IV, V, VI and VII based on the corresponding path. For example, in the case of a transition from a current state 000 into a next state 100, the ruler selector 39f selects ruler type II.

The process for selecting the ruler type is performed by the counter-operation of the Trellis encoder shown in FIG. 5. In the Trellis encoder, if the signals $S_0$, $S_1$ and $S_2$ are '000,' the output $EN_1$ of the exclusive OR gate 36c becomes '0' and the output $EN_0$ of the exclusive OR gate 36d becomes '0'. If the output signal EN2 of the precoder 33 is '0,' the input of the TCM mapper 37 becomes '000' and the output becomes 7V as shown in FIG. 7. If the input signal $IN_0$ newly input to the convolutional encoder 36 is '1,' $S_0$, $S_1$ and $S_2$ become '100,' the output $EN_1$ of the exclusive OR gate 36c is '1' and the output $EN_0$ of the exclusive OR gate 36d is '1' If the output signal $EN_2$ of the precoder 33 is '0,' the output of the TCM mapper 37 is 3V. In this example, since the value of the delay 38b is 7V and the current input value is 3V, the output of the post-comb filter 38 is −4V.

If the output signal $EN_2$ of the precoder 33 is '1,' the output of the TCM mapper 37 is −5V. In this example, the output of the post-comb filter 38 is −12V. To review this example, at the time of transition from the current state '000' into the next state '110' as shown in FIG. 9, if there is no change in the value of the output signal $EN_2$ of the precoder 33, the output of the post-comb filter 38 is −4V. If there is a change in the value of the output signal $EN_2$ of the precoder 33, i.e., a change from '0' into '1' or a change from '1' into '0,' the output of the post-comb filter 38 becomes −12 or 4V, thereby selecting the ruler type II in FIG. 15 and utilizing the difference value between the voltage −12V, 4V and −4V to be input when there is no error and the input signal, after obtaining the Euclidean distance $d_2$ in FIG. 14.

If the output of the post-comb filter 38 is applied to the distance mapper 39a and at the same time is applied to the slicer 39h via the delay 39g, the slicer 39h slices the applied values in accordance with the ruler type selected by the ruler selector 39f, as shown in FIG. 15, and outputs either '0' or '1'.

For example, if the signal output by the post-comb filter 38 is 0.5 and the ruler selector 39f selects the ruler type II, the slicer 39h compares the input signal whose magnitude is 0.5 with the values associated with the selected ruler type. The input signals −12, −4 and 4 are associated with the ruler type II. Here, since the input signal is 0.5, 4 is the closest value. Therefore, the slicer 39h outputs '1' as decoded signal DEC, to the TCM mapper 37. Similarly, the value of the lower one bit $IN_0$ of the Trellis encoder is decoded via the distance mapper 39a, Viterbi decoder 39b and delays 39c, 39d and 39e to then be output as a decoded value $DEC_0$.

The path is known by setting the output signal and input signal as the current state and next state, respectively, as shown in FIG. 9. The ruler type is selected according to the corresponding path by the ruler selector 39f. The input signals are compared to the values associated with the ruler type selected by the ruler selector 39f, in the slicer 39h, so that the slicer 39h decodes one bit data corresponding to the closest value as shown in FIG. 14, into the data corresponding to the upper one bit $IN_2$ of the Trellis encoder and outputs the decoded data $DEC_1$.

The switches $SW_1$, $SW_2$ and $SW_3$ shown in FIGS. 5 and 6 will now be described. If the precoder 33 is by-passed in the Trellis encoder, it is switched so that the precoder 40 precodes the signal output by the partial response Trellis decoder 39 and the postcoder 43 is by-passed, as shown in FIG. 6.

Reversely, if the precoder 33 is utilized by in the Trellis encoder, it is switched so that the precoder 40 is by-passed and the signal output by the postcoder 43 is output.

That is, the switch $SW_2$ does not select the precoder and the switch $SW_3$ switches so as to select position $P_2$, thereby preventing an increase in errors.

Figure 10:
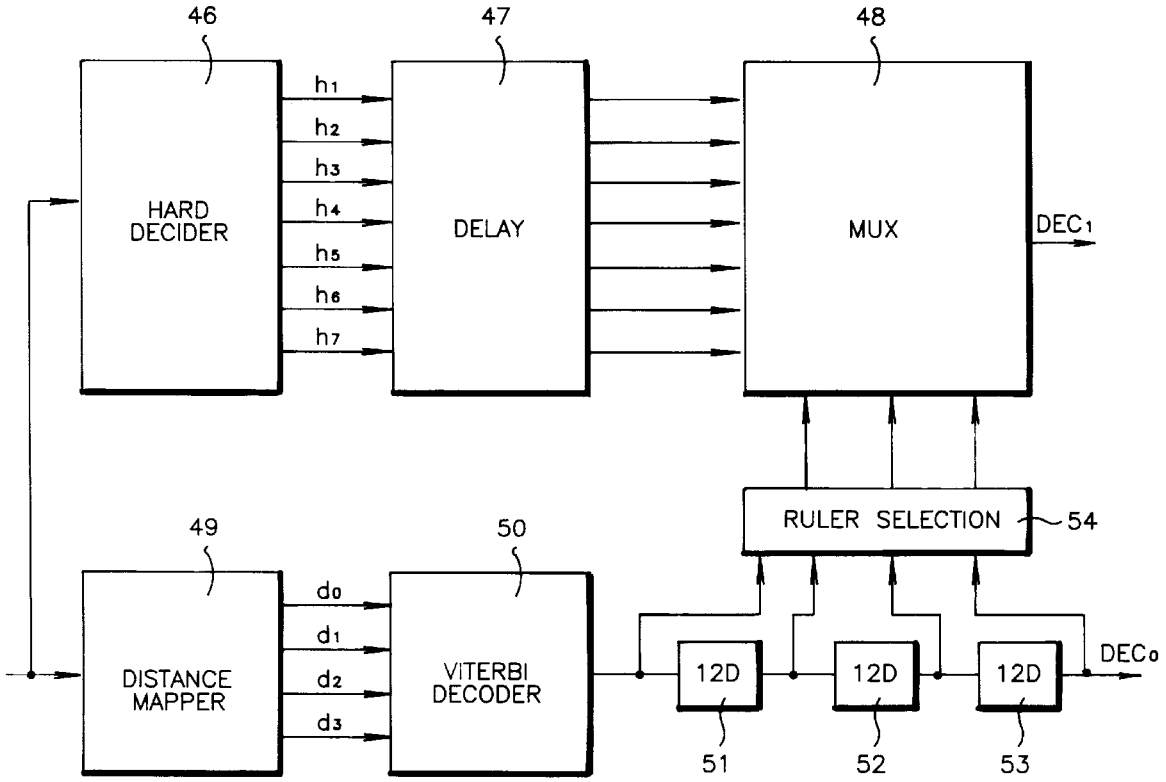
FIG. 10 is a schematic diagram of the partial response Trellis decoder according to one embodiment of the present invention.

FIG. 10 shows the partial response Trellis decoder according to another embodiment of the present invention which includes a distance mapper 49, a Viterbi decoder 50, delays 47, 51, 52 and 53, a ruler selector 54, a hard decider 46 and a multiplexer 48. The signals are sliced with respect to all of the selected ruler types and then selectively one of the sliced results is output. The functions of the distance mapper 49, Viterbi decoder 50, delays 47, 51, 52 and 53 and ruler selector 54 are the same as those of the partial response Trellis decoder according to one embodiment of the present invention shown in FIG. 6.

The hard decider 46 slices and hard decides the input signals in accordance with seven ruler types as shown in FIG. 15 and as previously discussed in regard to slicer 39h. In FIG. 10, $h_i$ ($h_1$ to $h_7$) are the values output when the input signals are sliced depending on the ith ruler type.

The delay 47 delays the signal output by the hard decider 46 for a constant time in order to synchronize the signal with the ruler selector 54 and outputs the delayed signal to the multiplexer 48.

The multiplexer 48 selects and outputs signals matching the ruler type selected by the ruler selector 54 among the signals delayed by the delay means 47 while Viterbi decoding.

The operation of the partial response Trellis decoder according to another embodiment of the present invention having the aforementioned configuration will now be described in detail.

As shown in FIG. 14, the Euclidean distances $d_0$, $d_1$, $d_2$ and $d_3$ are obtained from the input signals from which the NTSC interference has been removed in the distance mapper 49 and are Viterbi decoded in the Viterbi decoder 50.

The data output by the Viterbi decoder 50 is delayed in three steps through the delays 51, 52 and 53 and is output to the ruler selector 54. The ruler selector 54 selects a ruler type depending on the signals output by the delays 51, 52 and 53 as shown in FIG. 9.

The input signals from which the NTSC interference has been removed in the distance mapper 49 are sliced and are hard decided in the hard decider 46, respectively, as shown in FIG. 15. One of the signals output by the hard decider 46 is selected depending the ruler type to then be output. The lower one bit $IN_0$ of the Trellis encoder is decoded and output as the decoded signal $DEC_0$ through the distance mapper 49 and Viterbi decoder 50, and the upper one bit $IN_1$ of the Trellis encoder is decoded and output as the decoded signal $DEC_1$ through the hard decider 46, relay and multiplexer 48.

Figure 11:
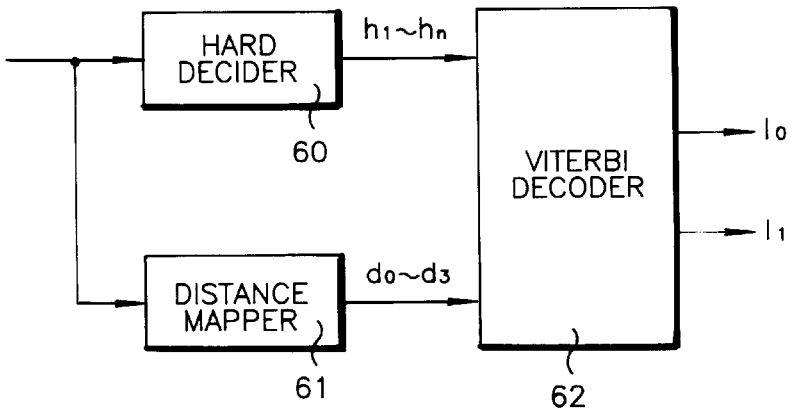
FIG. 11 is a schematic diagram of the partial response Trellis decoder according to another embodiment of the present invention.

As shown in FIG. 11, the partial response Trellis decoder according to still another embodiment of the present invention includes a distance mapper 61, a hard decider 60 and a Viterbi decoder 62.

The distance mapper 61 calculates Euclidean distances $d_0$, $d_1$, $d_2$ and $d_3$ from the input signals, as shown in FIG. 14 and previously discussed in reference to other embodiments of the present invention.

The hard decider 60 hard decides the signal output after the NTSC interference is removed and outputs hard decision values $h_1$ to $h_7$. The operation of the hard decider 60 is the same as discussed above with reference to hard decider 46 and as shown in FIG. 15.

Figure 12:
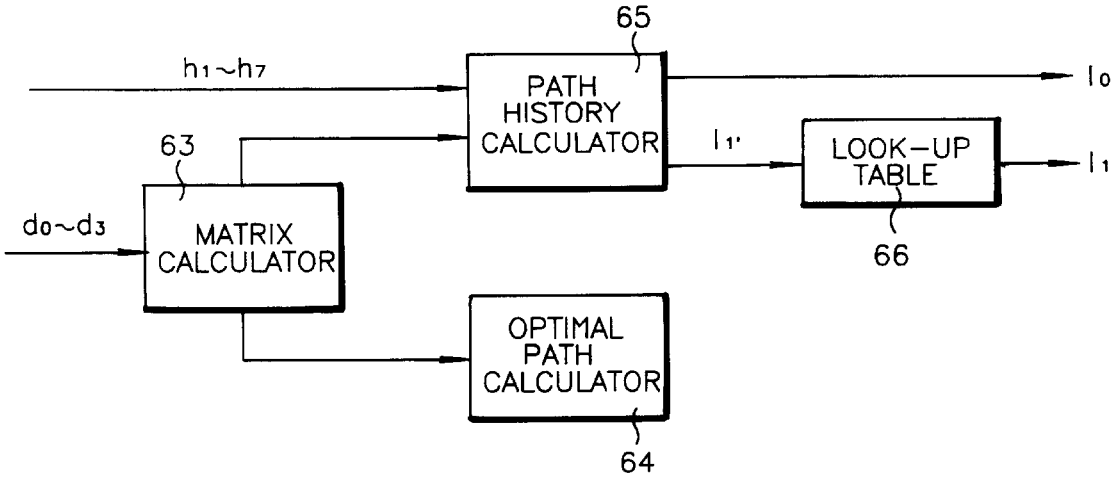
FIG. 12 is a detailed schematic diagram of the Viterbi decoder shown in FIG. 11.

As shown in FIG. 12, the Viterbi decoder 62 includes a matrix calculator 63 for obtaining the difference between the Euclidean distances $d_0$, $d_1$, $d_2$ and $d_3$ and the branches of the respective states and then calculating the survival path and the accumulative matrix value by adding the current difference value with the accumulative previous distance values, an optimal path calculator 64 for obtaining the optimal path within the view area from the accumulative matrix value output by the matrix calculator 63, a path history calculator 65 for directly outputting the upper one bit value using hard decision values $h_1$ to $h_7$ output by the hard decider 60, the survival path output by the matrix calculator 63 and the optimal path output by the optimal path calculator 64 and for outputting a signal for selecting the lower one bit, and a look-up table 66 for outputting the lower one bit depending on the selection signal output by the path history calculator 65. The Viterbi decoder 62 Viterbi decodes the data output by the distance mapper 61 and hard decider 60.

The operation of the partial response Trellis decoder according to this latter embodiment of the present invention having the aforementioned configuration will be described.

The distance mapper 61 calculates and outputs the Euclidean distances $d_0$, $d_1$, $d_2$ and $d_3$ depending on the signal output after the NTSC interference is removed by a post-comb filter. The upper one bit is compared with the previous data depending on the input signal. The results of the comparison as to whether they are same or different is represented by the respective sets, I, II, III, IV, V, VI and VII.

The Euclidean distances $d_0$, $d_1$, $d_2$ and $d_3$ and the set values h1 to h7 of the hard decider 60 are Viterbi decoded by the Viterbi decoder 62 resulting in the original two bits $I_0$ and $I_1$ having been input to the Trellis encoder. The operation of the Viterbi decoder 63 will be described.

The Euclidean distances $d_0$, $d_1$, $d_2$ and $d_3$ are used in obtaining the difference between the Euclidean distances $d_0$, $d_1$, $d_2$ and $d_3$ and the branches of the respective states in the matrix calculator 63. The obtained values are added with the previous distance values and output as the survival paths and accumulative matrix values. The accumulative matrix values of the matrix calculator 63 are used in obtaining the optimal path within the view area in the optimal path calculator 64.

The outputs $h_1$ to $h_7$ of the hard decider 60, the survival paths output by the matrix calculator 63 and the states of the optimal paths are used in obtaining the values to be output as the optimal path selected by the path history calculator 65. The lower one bit $I_1$ having been input to the Trellis encoder from the path history calculator 65 is output by the lookup table 66. The path history calculator 65 receives the outputs $h_1$ to $h_7$ from the hard decider 60, the survival paths output by the matrix calculator 63 and the states of the optimal path calculator 64 and determines the values to be output as the selected optimal path.

The path history calculator 65 includes a memory for storing the values of $h_1$ to $h_7$ and the survival path, and a circuit for tracing the memory and obtaining the outputs for the optimal path. However, in view of the conceptual path history calculator 65, as shown in FIG. 9, when the states of S1 and S2 are the same as the current state, the relation between the state change depending on the inputs $I_0$ and $I_1$ and the outputs of the post-comb filter for that time can only be constructed by eight states, and the hard decision information and the distance information can be indicated in accordance with the respective states.

In order to obtain the output of the optimal path from the Trellis decoder, there should be a view area for a certain period of time. As shown in FIG. 9, the sections of the view area includes the information on the transition direction of the respective states and the hard decision values due to the transition.

Figure 13:
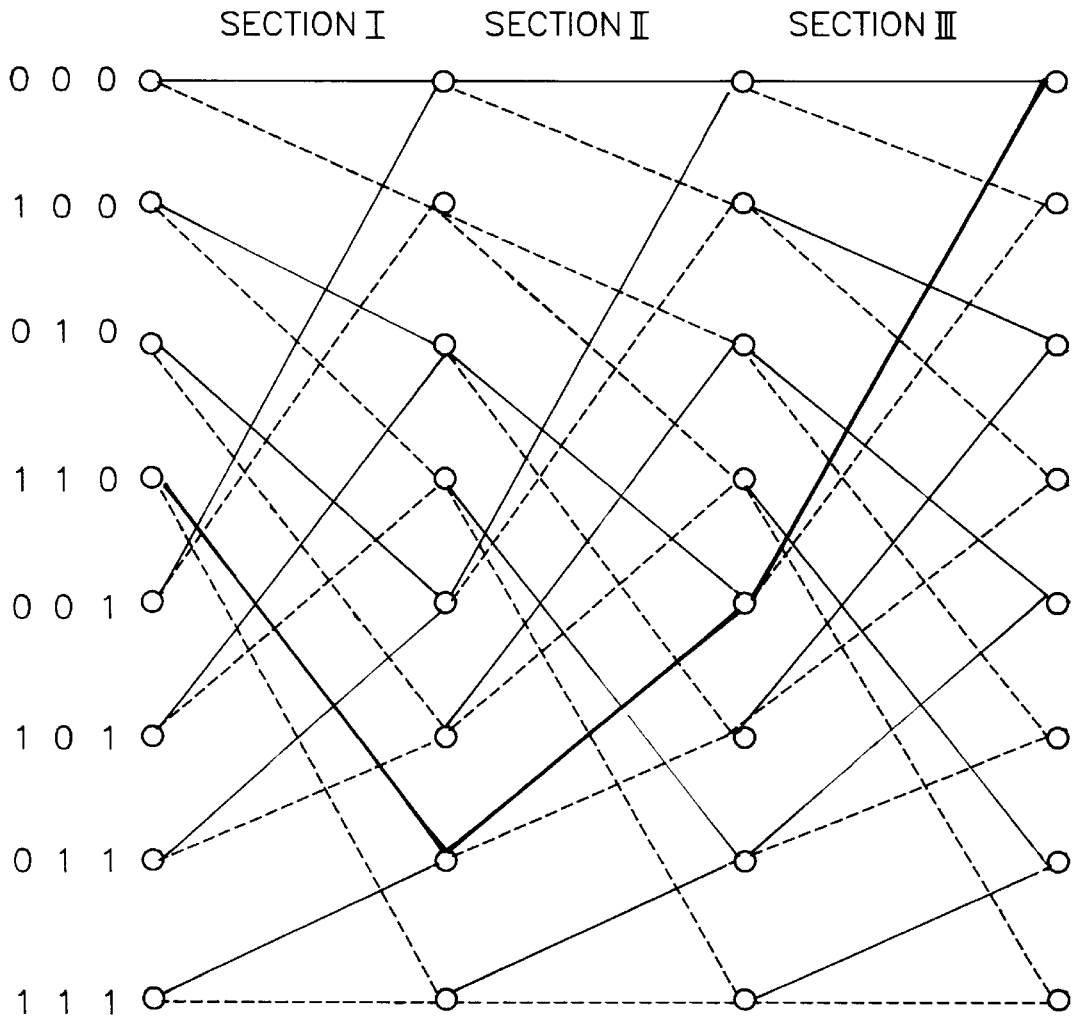
FIG. 13 is a diagram for explaining the operation of the Viterbi decoder shown in FIG. 12.

For example, assuming that the sections of the view area are set as three, the optimal state output by the optimal path calculator is '000', and the survival path of the state '000' is the one marked with a dark line in FIG. 13, the path history calculator 65 counter-traces the dark line and outputs the information on this line within the section I. The hard decision value of the dark lined path within the section I is output as the value of the upper one bit $I_0$, and the information $I_1$, that the transition of the optimal path is from the state '110' into '011' is output as the value of the lower one bit $I_i$. Therefore, in order to send the signal I', to the lookup table 66, the lower one bit $I_1$ of the input value to the Trellis encoder is output.

As described above, the partial response Trellis decoder of the present invention, allows for the easy implementation of a HDTV system.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A partial response Trellis decoder for a high definition television (HDTV), said partial response Trellis decoder receiving an input signal from which NTSC interference has been removed and said partial response Trellis decoder comprises:

a distance mapper for calculating first, second, third and fourth Euclidean distances between said input signal and a reference value;

a Viterbi decoder for Viterbi decoding said first, second, third and fourth Euclidean distances calculated by said distance mapper;

a first delay for delaying and outputting the Viterbi decoded data for each Euclidean distance;

a ruler selector for selecting a ruler type signal based on the signals output by said first delay; and a slicer for slicing said selected ruler type signal and said input signal.

2. The partial response Trellis decoder for a HDTV as claimed in claim 1, further comprising a second delay for delaying said input signal for a constant time in order to synchronize the input of said input signal to said slicer with the input of said ruler type signal to said slicer.

3. The partial response Trellis decoder for a HDTV as claimed in claim 1, wherein said distance mapper obtains a first Euclidean distance, by using the point closest among (0, 8, −8) to said input signal as said reference value, a second Euclidean distance is calculated by using the point closest among (2, 10, −6, −14) to said input signal as said reference value, a third Euclidean distance is calculated by using the closest point among (4, 12, −4, −12) to said input signal as said reference value, and a fourth Euclidean distance is calculated by using the point closest among (6, 14, −2, −10) to said input signal as said reference value.

4. The partial response Trellis decoder for a HDTV as claimed in claim 1, wherein said first delay delays the data output by said Viterbi decoder through three delays and outputs a current state and a next state to said ruler selector.

5. The partial response Trellis decoder for a HDTV as claimed in claim 4, wherein said first delay includes:

a single delay for delaying the data output by said Viterbi decoder by 12 symbols and for outputting said single delayed signal to said ruler selector;

a second delay for delaying the data output by said single delay by 12 symbols and for outputting said second delayed signal to said ruler selector; and a third delay for delaying the data output by said second delay by 12 symbols and for outputting said third delayed signal to said ruler selector.

6. The partial response Trellis decoder for a HDTV as claimed in claim 1, wherein said ruler selector selects a first, second, third, fourth, fifth, sixth or seventh ruler type I, II, III, IV, V, VI or VII based on the signals output by said first delay.

7. The partial response Trellis decoder for a HDTV as claimed in claim 4, wherein said ruler selector selects:

a fourth ruler type IV if the current state signal is (000) and the next state signal is (000);

a second ruler type II if the current state signal is (000) and the next state signal is (100);

a fifth ruler type V if the current state signal is (100) and the next state signal is (010);

a third ruler type III if the current state signal is (100) and the next state signal is (110);

a third ruler type III if the current state signal is (010) and the next state signal is (001);

a fifth ruler type V if the current state signal is (010) and the next state signal is (101);

a fourth ruler type IV if the current state signal is (110) and the next state signal is (011);

a sixth ruler type VI if the current state signal is (110) and the next state signal is (111);

a sixth ruler type VI if the current state signal is (001) and the next state signal is (000);

a fourth ruler type IV if the current state signal is (001) and the next state signal is (100);

a third ruler type III if the current state signal is (101) and the next state signal is (010);

a first ruler type I if the current state signal is (101) and the next state signal is (110);

a fifth ruler type V if the current state signal is (011) and the next state signal is (001);

a seventh ruler type VII if the current state signal is (011) and the next state signal is (101);

a second ruler type II if the current state signal is (111) and the next state signal is (011); and a fourth ruler type IV if the current state signal is (111) and the next state signal is (111).

8. The partial response Trellis decoder for a HDTV as claimed in claim 1, wherein:

if said selected ruler type is ruler type I, said slicer outputs '1' if said input signal is close to −14 or 2 and '0' if said input signal is close to −6;

if said selected ruler type is ruler type II, the slicer outputs '1' if said input signal is close to −12 or 4 and '0' if said input signal is close to −4;

if said selected ruler type is ruler type III, the slicer outputs '1' if said input signal is close to −10 or 6 and '0' if said input signal is close to −2;

if said selected ruler type is ruler type IV, the slicer outputs '1' if the input signal is close to −8 or 8 and '0' if the input signal is close to 0;

if said selected ruler type is ruler type V, the slicer outputs '1' if the input signal is close to −6 or 10 and '0' if the input signal is close to 2;

if said selected ruler type is ruler type VI, the slicer outputs '1' if the input signal is close to −4 or 12 and '0' if the input signal is close to 4; and if the selected ruler type is ruler type VII, the slicer outputs '1' if the input signal is close to 14 or −2 and '0' if the input signal is close to 6.

9. A partial response Trellis decoder for a high definition television (HDTV), said partial response Trellis decoder receiving an input signal from which NTSC interference has been removed and said partial Trellis decoder comprises:

a distance mapper for calculating first, second, third and fourth Euclidean distances between said input signal and a reference value;

a Viterbi decoder for Viterbi decoding the first, second, third and fourth Euclidean distances calculated by said distance mapper;

a first delay means for delaying and outputting the Viterbi decoded data for each Euclidean distance;

a ruler selector for selecting a ruler type signal based on the signals output by said first delay means;

a hard decider for slicing and hard deciding said input signal; and a multiplexer for selecting and outputting one of the signals output by said hard decider.

10. The partial response Trellis decoder for a HDTV as claimed in claim 9, further comprising second delay means for delaying the signal output from said hard decider for synchronizing the outputs of said hard decider, with outputs of said selected ruler type signal, the synchronized output of the hard decider and said ruler type signal being input to said multiplexer.

11. The partial response Trellis decoder for a HDTV as claimed in claim 9, wherein said distance mapper obtains a first Euclidean distance, by using the point closest among (0, 8, −8) to said input signal as said reference value, a second Euclidean distance is calculated by using the point closest among (2, 10, −6, −14) to said input signal as said reference value, a third Euclidean distance is calculated by using the point closest among (4, 12, −4, −12) to said input signal as said reference value, and a fourth Euclidean distance is calculated by using the point closest among (6, 14, −2, −10) to said input signal as said reference value.

12. The partial response Trellis decoder for a HDTV as claimed in claim 9, wherein said first delay means delays the data output by said Viterbi decoder through three delays and outputs current state signal and a next state to said ruler selector.

13. The partial response Trellis decoder for a HDTV as claimed in claim 12, wherein said first delay means includes:

a single delay for delaying the data output by said Viterbi decoder by 12 symbols and for outputting said single delayed signal to said ruler selector;

a second delay for delaying the data output by said single delay by 12 symbols and for outputting said second delayed signal to said ruler selector; and a third delay for delaying the data output by said second delay by 12 symbols and for outputting said third delayed signal to said ruler selector.

14. The partial response Trellis decoder for a HDTV as claimed in claim 9, wherein said ruler selector selects a first, second, third, fourth, fifth, sixth or seventh ruler type I, II, III, IV, V, VI or VII based on the signals output by said first delay means.

15. The partial response Trellis decoder for a HDTV as claimed in claim 12, wherein said ruler selector selects:

a fourth ruler type IV if the current state signal is (000) and the next state signal is (000);

a second ruler type II if the current state signal is (000) and the next state signal is (100);

a fifth ruler type V if the current state signal is (100) and the next state signal is (010);

a third ruler type III if the current state signal is (100) and the next state signal is (110);

a third ruler type III if the current state signal is (010) and the next state signal is (001);

a fifth ruler type V if the current state signal is (010) and the next state signal is (101);

a fourth ruler type IV if the current state signal is (110) and the next state signal is (011);

a sixth ruler type VI if the current state signal is (110) and the next state signal is (111);

a sixth ruler type VI if the current state signal is (001) and the next state signal is (000);

a fourth ruler type IV if the current state signal is (001) and the next state signal is (100);

a third ruler type III if the current state signal is (101) and the next state signal is (010);

a first ruler type I if the current state signal is (101) and the next state signal is (110);

a fifth ruler type V if the current state signal is (011) and the next state signal is (001);

a seventh ruler type VII if the current state signal is (011) and the next state signal is (101);

a second ruler type II if the current state signal is (111) and the next state signal is (011); and a fourth ruler type IV if the current state signal is (111) and the next state signal is (111).

16. The partial response Trellis decoder for a HDTV as claimed in claim 9, wherein:

if said selected ruler type is ruler type I, said hard decider outputs '1' if said input signal is close to −14 or 2 and '0' if said input signal is close to −6;

if said selected ruler type is ruler type II, the hard decider outputs '1' if said signal is close to −12 or 4 and '0' if said input signal is close to −4;

if said selected ruler type is ruler type III, the hard decider outputs '1' if said input signal is close to −10 or 6 and '0' if said input signal is close to −2;

if said selected ruler type is ruler type IV, the hard decider outputs '1' if the input signal is close to −8 or 8 and '0' if the input signal is close to 0;

if said selected ruler type is ruler type V, the hard decider outputs '1' if the input signal is close to −6 or 10 and '0' if the input signal is close to 2;

if said selected ruler type is ruler type VI, the hard decider outputs '1' if the input signal is close to −4 or 12 and '0' if the input signal is close to 4; and if the selected ruler is ruler type VII, the hard decider outputs '1' if the input signal is close to 14 or −2 and '0' if the input signal is close to 6.

17. A partial response Trellis decoder for a high definition television (HDTV), said partial response Trellis decoder receiving an input signal from which NTSC interferences have been removed and said partial Trellis decoder comprises:

a distance mapper for calculating first, second, third and fourth Euclidean distances between said input signal and a reference value;

a hard decider for hard deciding said input signal and for outputting the hard decision value; and a Viterbi decoder for Viterbi decoding the data output by said distance mapper and said hard decider.

18. The partial response Trellis decoder for a HDTV as claimed in claim 17, wherein said Viterbi decoder comprises:

a matrix calculator for obtaining the difference between the Euclidean distances output by said distance mapper and branches of the respective states and for calculating a survival path and an accumulative matrix value by adding the difference value with an accumulative previous distance value;

an optional path calculator for obtaining the optimal path within a view area from the accumulative matrix value output by said matrix calculator;

a path history calculator for directly outputting the upper one bit value of the output by said hard decider, the survival path output by the matrix calculator, and the optimal path output by the optimal path calculator, and for outputting a signal for selecting the lower one bit; and a look-up table for outputting the lower one bit depending on the selection signal output by the path history calculator.

19. The partial response Trellis decoder for a HDTV as claimed in claim 17, wherein said distance mapper obtains a first Euclidean distance, by using the point closest among (0, 8, −8) to said input signal as said reference value, a second Euclidean distance is calculated by using the point closest among (2, 10, −6, −14) to said input signal as said reference value, a third Euclidean distance is calculated by using the point closest among (4, 12, −4, −12) to said input signal as said reference value, and a fourth Euclidean distance is calculated by using the point closest among (6, 14, −2, −10) to said input signal as said reference value.

20. The partial response Trellis decoder for a HDTV as claimed in claim 17, wherein:

if a selected ruler type is ruler type I, said hard decider outputs '1' if said input signal is close to −14 or 2 and '0' if said input signal is close to −6;

if said selected ruler type is ruler type II, the hard decider outputs '1' if said input signal is close to −12 or 4 and '0' if said input signal is close to −4;

if said selected ruler type is ruler type III, the hard decider outputs '1' if said input signal is close to −10 or 6 and '0' if said input signal is close to −2;

if said selected ruler type is ruler type IV, the hard decider outputs '1' if the input signal is close to −8 or 8 and '0' if the input signal is close to 0;

if said selected ruler type is ruler type V, the hard decider outputs '1' if the input signal is close to −6 or 10 and '0' if the input signal is close to 2;

if said selected ruler type is ruler type VI, the hard decider outputs '1' if the input signal is close to −4 or 12 and '0' if the input signal is close to 4; and if the selected ruler type is ruler type VII, the hard decider outputs '1' if the input signal is close to 14 or −2 and '0' if the input signal is close to 6.

*21. A digital television system comprising:*

*a decoder receiving an input signal and comprising a first Trellis decoder unit and a second Trellis decoder unit;*

*a switch coupled to the first and second Trellis decoder units, the switch selecting the first Trellis decoder unit when the input signal contains an NTSC signal and the switch selecting the second Trellis decoder unit when the input signal does not contain an NTSC signal;*

*a filter coupled to the first Trellis decoder unit, the filter removing the NTSC signal from the input signal and outputting a filtered signal to the first Trellis decoder unit;*

*the first Trellis decoder unit comprising:*

*a distance mapper receiving the filtered signal from the filter;*

*a Viterbi decoder coupled to the distance mapper;*

*a first delay unit coupled to the Viterbi decoder;*

*a ruler selector coupled to the first delay unit; and*

*a slicer coupled to the ruler selector; and*

*the second Trellis decoder unit comprising a third decoder, the third decoder including a second delay unit and an adder coupled to the second delay unit.*

*22. The digital television system according to claim 21, wherein the filter comprises:*

*a third delay unit receiving an NTSC included signal and producing a delayed NTSC included signal; and*

*a subtractor subtracting the NTSC included signal from the delayed NTSC included signal.*

*23. The digital television system according to claim 21, wherein the second Trellis decoder unit includes a four state optimal Trellis decoder.*

*24. A digital television system comprising:*

*an encoder unit comprising:*

*a first encoder receiving a first input signal including: an adder receiving the first input signal and outputting a first encoded signal; and*

*a first delay unit coupled to the adder;*

*a second encoder receiving a second input signal and outputting second and third encoded signals;*

*a mapper receiving the first, second, and third encoded signals from the first and second encoders, respectively;*

*a decoder unit including a first Trellis decoder unit and a second Trellis decoder unit, the decoder unit comprising:*

*a switch coupled to the first and second Trellis decoder units, the switch selecting the first Trellis decoder unit when the input signal contains an NTSC signal and the switch selecting the second Trellis decoder unit when the input signal does not contain an NTSC signal;*

*a filter coupled to the first Trellis decoder unit, the filter removing the NTSC signal from the input signal and outputting a filtered signal to the first Trellis decoder unit;*

*the first Trellis decoder unit comprising:*

*a distance mapper receiving the filtered signal from the filter;*

*a Viterbi decoder coupled to the distance mapper;*

*a second delay unit coupled to the Viterbi decoder;*

*a ruler selector coupled to the second delay unit; and*

*a slicer coupled to the ruler selector; and*

*the second Trellis decoder unit comprising a third decoder, the third decoder including a third delay unit and a subtractor coupled to the third delay unit.*

*25. The digital television system according to claim 24, wherein the filter comprises:*

*a fourth delay unit receiving an NTSC included signal and producing a delayed NTSC included signal; and*

*a subtractor adding the NTSC included signal to the delayed NTSC included signal.*

*26. The digital television system according to claim 24, wherein the second Trellis decoder unit includes a four state optimal Trellis decoder.*

*27. The digital television system according to claim 24, wherein the second encoder includes:*

*a fourth delay unit receiving the second input signal;*

*a fifth delay unit coupled to the fourth delay unit;*

*a first exclusive OR gate coupled to the fourth and fifth delay units; and*

*a second exclusive OR gate coupled to the fifth delay unit.*

*28. A digital television system comprising:*

*a decoder receiving an input signal and comprising a first Trellis decoder unit and a second Trellis decoder unit;*

*a switch coupled to the first and second Trellis decoder units, the switch selecting the first Trellis decoder unit when the input signal contains an NTSC signal and the switch selecting the second Trellis decoder unit when the input signal does not contain an NTSC signal;*

*a filter coupled to the first Trellis decoder unit, the filter removing the NTSC signal from the input signal and outputting a filtered signal to the first Trellis decoder unit;*

*the first Trellis decoder unit comprising:*

*a distance mapper receiving the filtered signal from the filter;*

*a Viterbi decoder coupled to the distance mapper;*

*a hard decider coupled to the Viterbi decoder; and*

*the second Trellis decoder unit comprising a third decoder, the third decoder including a delay unit and an adder coupled to the delayed unit.*

*29. The digital television system according to claim 28, wherein the filter comprises:*

*a second delay unit receiving an NTSC included signal and producing a delayed NTSC included signal; and*

*an adder adding the NTSC included signal to the delayed NTSC included signal.*

*30. The digital television system according to claim 28, wherein the second Trellis decoder unit includes a four state optimal Trellis decoder.*

*31. A digital television system comprising:*

*an encoder unit comprising:*

*a first encoder receiving a first input signal including: an adder receiving the first input signal and outputting a first encoded signal; and*

*a first delay unit coupled to the adder;*

*a second encoder receiving a second input signal and outputting second and third encoded signals;*

*a mapper receiving the first, second, and third encoded signals from the first and second encoders, respectively;*

*a decoder unit including a first Trellis decoder unit and a second Trellis decoder unit, the decoder unit comprising:*

*a switch coupled to the first and second Trellis decoder units, the switch selecting the first Trellis decoder unit when the input signal contains an NTSC signal and the switch selecting the second Trellis decoder unit when the input signal does not contain an NTSC signal;*

*a filter coupled to the first Trellis decoder unit, the filter removing the NTSC signal from the input signal and outputting a filtered signal to the first Trellis decoder unit;*

*the first Trellis decoder unit comprising:*

*a distance mapper receiving the filtered signal from the filter;*

*a Viterbi decoder coupled to the distance mapper;*

*a slicer coupled to the Viterbi decoder; and*

*the second Trellis decoder unit comprising a third decoder, the third decoder including a second delay unit and a subtractor coupled to the second delay unit.*

*32. The digital television system according to claim 31, wherein the filter comprises:*

*a third delay unit receiving an NTSC included signal and producing a delayed NTSC included signal; and*

*a subtractor subtracting the NTSC included signal from the delayed NTSC included signal.*

*33. The digital television system according to claim 31, wherein the second Trellis decoder unit includes a four state optimal Trellis decoder.*

*34. The digital television system according to claim 31, wherein the second encoder includes:*

*a third delay unit receiving the second input signal;*

*a fourth delay unit coupled to the third delay unit;*

*a first exclusive OR gate coupled to the third and fourth delay units; and*

*a second exclusive OR gate coupled to the fourth delay unit.*

*35. A digital television system comprising:*

*a Trellis decoder receiving an encoded signal comprising:*

*a distance mapper receiving the encoded signal;*

*a Viterbi decoder coupled to the distance mapper;*

*a slicer coupled to the Viterbi decoder; and*

*a second decoder coupled to the Trellis decoder, the second decoder including a delay unit and an adder coupled to the delay unit.*

*36. The digital television system according to claim 35, wherein the Trellis decoder includes a four state optimal Trellis decoder.*

*37. A digital television signal comprising:*

*an encoder unit comprising:*

*a first encoder receiving a first input signal including:*

*an adder receiving the first input signal and outputting a first encoded signal; and*

*a first delay unit coupled to the adder;*

*a second encoder receiving a second input signal and outputting second and third encoded signals;*

*a mapper receiving the first, second, and third encoded signals from the first and second encoders, respectively;*

*a Trellis decoder receiving an encoded signal from the encoder unit comprising:*

*a distance mapper receiving the encoded signal;*

*a Viterbi decoder coupled to the distance mapper;*

*a slicer coupled to the Viterbi decoder; and*

*a second decoder coupled to the Trellis decoder, the second decoder including a second delay unit and an adder coupled to the second delay unit.*

*38. The digital television system according to claim 37, wherein the Trellis decoder includes a four state optimal Trellis decoder.*

*39. The digital television system according to claim 37, wherein the second encoder includes:*

*a third delay unit receiving the second input signal;*

*a fourth delay unit coupled to the third delay unit;*

*a first exclusive OR gate coupled to the third and fourth delay units; and*

*a second exclusive OR gate coupled to the fourth delay unit.*

*40. A digital television system having an encoder unit, the encoder comprising:*

*a first encoder receiving a first input signal including:*

*an adder receiving the first input signal and outputting an first encoded signal; and*

*a delay unit coupled to the adder;*

*a second encoder receiving a second input signal and outputting second and third encoded signals; and*

*a mapper receiving the first, second, and third encoded signals from the first and second encoders, respectively.*

*41. The digital television system according to claim 40, wherein the second encoder includes:*

*a second delay unit receiving the second input signal;*

*a third delay unit coupled to the second delay unit;*

*a first exclusive OR gate coupled to the second and third delay units; and*

*a second exclusive OR gate coupled to the third delay unit.*

*42. A method for decoding an input signal for a digital television system, the method comprising the steps of:*

*Trellis decoding the input signal, the decoding step comprising the steps of:*

*receiving the input signal and mapping the input signal to produce a mapped signal for determining a distance error in the input signal;*

*slicing the input signal; and*

*Viterbi decoding the mapped signal and the sliced input signal and outputting a Viterbi decoded signal;*

*delaying the Viterbi decoded signal; and*

*adding the Viterbi decoded signal and the delayed Viterbi decoded signal.*

*43. A method for encoding a signal for a digital television system, the method comprising the steps of:*

*receiving a first input signal and adding the first input signal to a feedback signal to produce an added signal, the added signal including a first encoded signal; and*

*delaying the added signal to produce the feedback signal, the feedback signal including the added signal;*

*receiving a second input signal and outputting second and third encoded signals; and*

*mapping the first, second, and third encoded signals.*

*44. A method for operating a digital television system, the method comprising the steps of:*

*receiving a first input signal and adding the first input signal to a feedback signal to produce an added signal, the added signal including a first encoded signal; and*

*delaying the added signal to produce the feedback signal, the feedback signal including the added signal;*

*receiving a second input signal and outputting second and third encoded signals;*

*mapping the first, second, and third encoded signals and producing a transmission signal;*

*Trellis decoding the transmission signal, the decoding step comprising the steps of:*

*receiving the transmission signal and mapping the transmission signal to produce a mapped signal for determining a distance error in the transmission signal;*

*slicing the transmission signal; and*

*Viterbi decoding the mapped signal and the sliced transmission signal and outputting a Viterbi decoded signal;*

*delaying the Viterbi decoded signal; and*

*adding the Viterbi decoded signal and the delayed Viterbi decoded signal.*

*45. A digital television system comprising:*

*a randomizer receiving an input signal;*

*an R-S encoder coupled to the randomizer;*

*a data interleaver coupled to the R-S encoder;*

*a Trellis encoder coupled to the data interleaver;*

*a multiplexer coupled to the Trellis encoder;*

*a pilot inserter coupled to the multiplexer;*

*a VSB modulator coupled to the pilot inserter; and*

*an RF up-converter coupled to the VSB modulator and outputting a transmission signal,*

*wherein the Trellis encoder includes:*

*a first encoder receiving a first input signal including:*

*an adder receiving the first input signal and outputting a first encoded signal; and*

*a delay unit coupled to the adder;*

*a second encoder receiving a second input signal and outputting second and third encoded signals; and*

*a mapper receiving the first, second, and third encoded signals from the first and second encoders, respectively.*

*46. A digital television system comprising:*

*a tuner receiving a transmission signal;*

*a filter and sync signal detector coupled to the tuner;*

*a sync and timing unit coupled to the filter and sync signal detector;*

*an equalizer coupled to the sync and timing unit;*

*a phase tracker coupled to the equalizer;*

*a decoder unit coupled to the phase tracker;*

*a data deinterleaver coupled to the Trellis decoder;*

*an R-S decoder coupled to the data deinterleaver; and*

*a derandomizer coupled to the R-S decoder;*

*wherein the decoder unit includes:*

*a Trellis decoder having;*

*a distance mapper;*

*a Viterbi decoder coupled to the distance mapper; and*

*a slicer coupled to the Viterbi decoder; and*

*a second decoder coupled to the Trellis decoder, the second decoder including a delay unit and an adder coupled to the delay unit.*

*47. The digital television according to claim 46, further comprising an NTSC rejection filter coupled to the filter and sync signal detector and the equalizer.*

*48. A digital television system comprising:*

*a transmitter unit including:*

*a randomizer receiving an input signal;*

*an R-S encoder coupled to the randomizer;*

*a data interleaver coupled to the R-S encoder;*

*a Trellis encoder coupled to the data interleaver;*

*a multiplexer coupled to the Trellis encoder;*

*a pilot inserter coupled to the multiplexer;*

*a VSB modulator coupled to the pilot inserter; and*

*an RF up-converter coupled to the VSB modulator and outputting a transmission signal,*

*wherein the Trellis encoder includes:*

*a first encoder receiving a first input signal including:*

*an adder receiving the first input signal and outputting a first encoded signal; and*

*a delay unit coupled to the adder;*

*a second encoder receiving a second input signal and outputting second and third encoded signals; and*

*a mapper receiving the first, second, and third encoded signals from the first and second encoders, respectively,*

*a receiver unit comprising:*

*a tuner receiving a transmission signal;*

*a filter and sync signal detector coupled to the tuner;*

*a sync and timing unit coupled to the filter and sync signal detector;*

*an equalizer coupled to the sync and timing unit;*

*a phase tracker coupled to the equalizer;*

*a decoder unit coupled to the phase tracker;*

*a data deinterleaver coupled to the Trellis decoder;*

*an R-S decoder coupled to the data deinterleaver; and*

*a derandomizer coupled to the R-S decoder;*

*wherein the decoder unit includes:*

*a Trellis decoder having:*

*a distance mapper;*

*a Viterbi decoder coupled to the distance mapper; and*

*a slicer coupled to the Viterbi decoder; and*

*a second decoder coupled to the Trellis decoder, the second decoder including a delay unit and an adder coupled to the delay unit.*

*49. The digital television system according to claim 48, further comprising an NTSC rejection filter coupled to the filter and sync signal detector and the equalizer.*

* * * * *